No. 886,202.

PATENTED APR. 28, 1908.

W. H. GRASSER.
COMPOUND TOOL.
APPLICATION FILED AUG. 13, 1907.

2 SHEETS—SHEET 1.

WITNESSES:

INVENTOR
William H. Grasser.
BY
Attorneys

No. 886,202. PATENTED APR. 28, 1908.
W. H. GRASSER.
COMPOUND TOOL.
APPLICATION FILED AUG. 13, 1907.
2 SHEETS—SHEET 2.
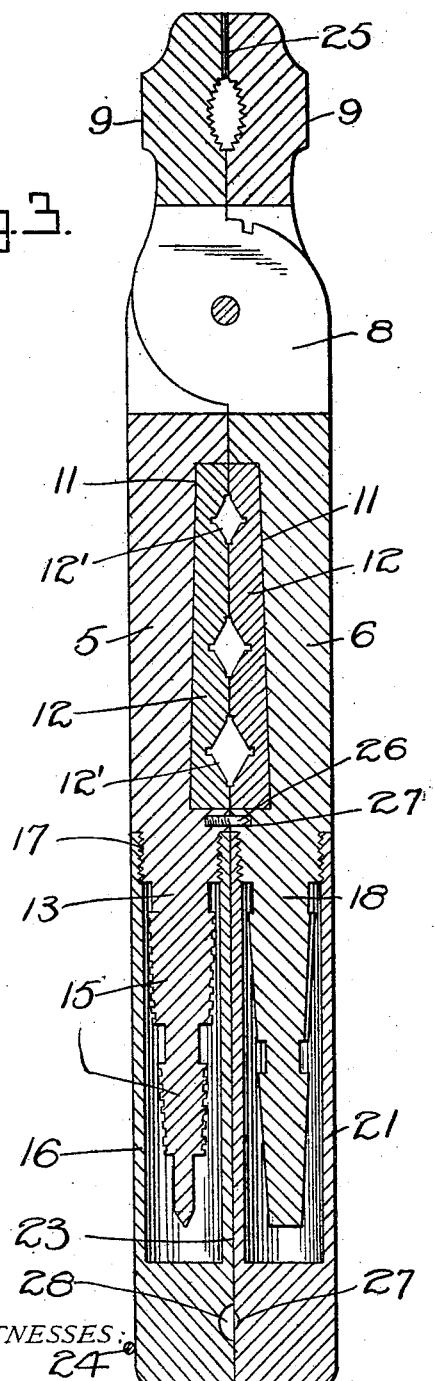
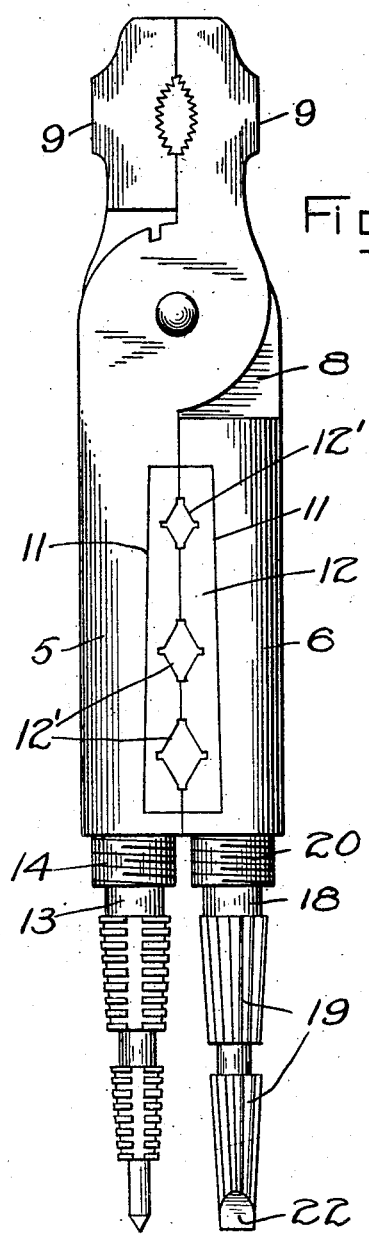
WITNESSES:
J. Lee Miller.
M. J. Miller.
INVENTOR
William H. Grasser.
BY Chandler & Chandler
Attorneys

UNITED STATES PATENT OFFICE.

WILLIAM H. GRASSER, OF CLARKSTON, WASHINGTON.

COMPOUND TOOL.

No. 886,202.  Specification of Letters Patent.  Patented April 28, 1908.

Application filed August 13, 1907. Serial No. 388,373.

*To all whom it may concern:*

Be it known that I, WILLIAM H. GRASSER, a citizen of the United States, residing at Clarkston, in the county of Asotin, State of Washington, have invented certain new and useful Improvements in Compound Tools; and I do hereby declare the following to be a full, clear, and exact description of the invention, such as will enable others skilled in the art to which it appertains to make and use the same.

This invention relates to compound tools and has for its object to provide a novel form of tool which is particularly well adapted for use by plumbers, steam fitters, boiler repairers, etc. In the tool, I have embodied only such elements as would be useful in these several arts, such as a pair of pliers, dies for threading pipes and bolts of various sizes, taps for threading nuts and for interiorly threading pipes, a pipe reamer, and a hammer.

One of the novel features of the invention resides in the fact that under normal conditions, the taps and reamer are concealed and the tool has merely the appearance of a pair of pliers. By so constructing the tool, it is not rendered cumbersome and difficult to handle and many other advantages too numerous to mention are secured.

Figure 1:
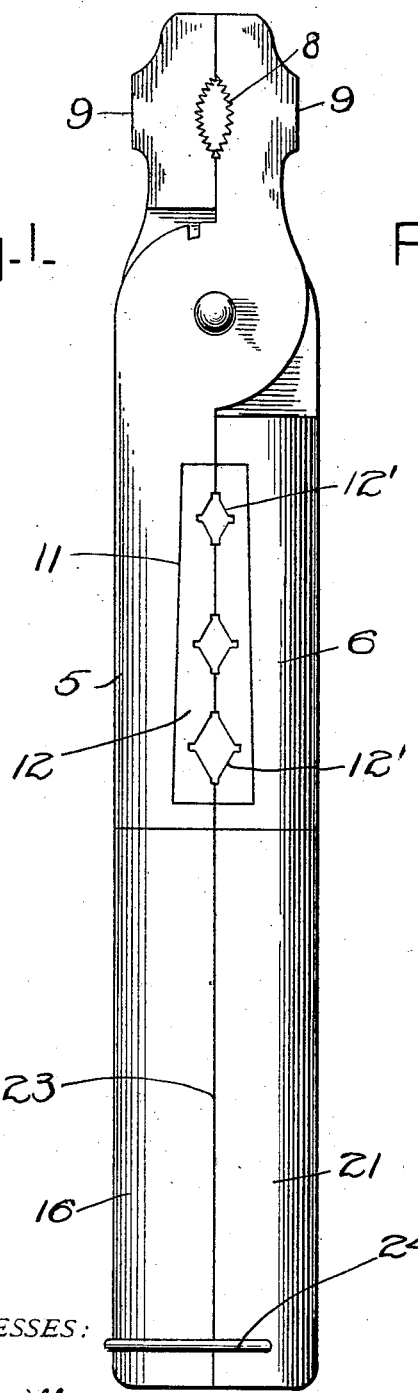
Figure 2:
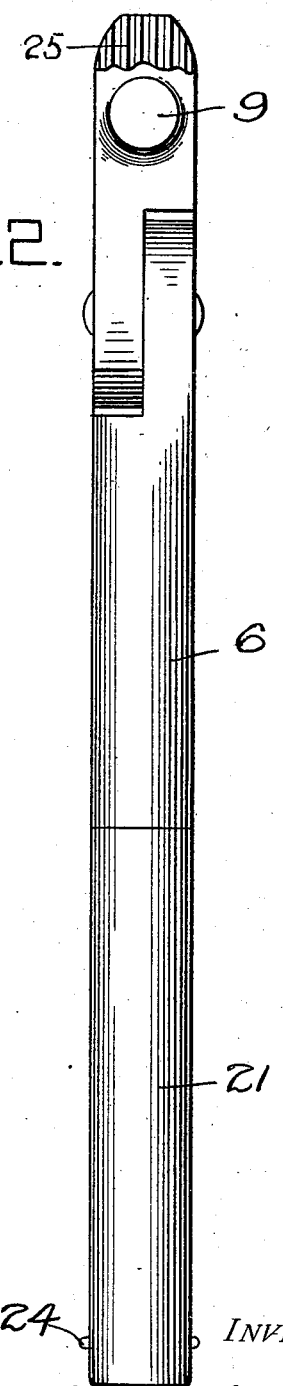

In the accompanying drawings, Figure 1 is a side elevation of the tool, Fig. 2 is an edge view thereof, Fig. 3 is a vertical sectional view therethrough, and Fig. 4 is a view similar to Fig. 1 but with the handles for the tool removed.

As shown in the drawings, the tool comprises a pair of pivoted handle members one of which is indicated by the numeral 5 and the other by the numeral 6, the said members are recessed and serrated as at 8 thereby forming a pair of pliers and at their said ends are provided with hammer heads 9. The members are flattened and broadened at and adjacent their pivot as is usually the case and are notched as to form a wire cutter. To the opposite sides of their pivot, each of the said members is recessed as indicated by the numeral 11 and seated in each of these recesses is a die block 12 which is provided with a plurality of recesses 12' the walls of which are serrated to form, in conjunction with the corresponding recesses of the other die block, dies for use in threading bolts and pipes.

Formed integral with the end of the handle member 5 and extending longitudinally therefrom is a tapered shank 13 which, adjacent its point of junction with the said handle member, is cylindrical in form and threaded as indicated by the numeral 14 and at intervals throughout the remainder of its length is provided with working portions 15 which constitute taps of different sizes for use in threading nuts or interiorly threading pipes. A hollow hand grip 16 receives the said tapered shank and is interiorly threaded as at 17 for engagement with the threaded portion 14 of the shank whereby the hand grip will be held in place thereon.

The shank 18 similar to the shank 13 is formed integral with the corresponding end of the handle member 6 and is provided with working portions 19 which form reamers whereby the tool may be employed to ream out pipes. This shank 18 is, as in the case of the shank 13, provided with a threaded cylindrical portion 20 and a hollow hand grip 21 is interiorly threaded at its open end and is normally engaged upon the shank. The shank 18 is preferably provided at its extreme end with a tapered portion 22 which forms a screw driver.

From the foregoing description of my invention, it will be seen that the taps and reamers are inclosed in the hand grips under normal conditions and that they may be readily exposed for use by simply removing one or the other of the grips depending upon the tool to be used.

The opposing sides of the hand grips are preferably flattened as at 23 and a bail 24 is pivoted to one of the grips and designed for engagement over the end of the other grip so as to lock the handle members against spreading when the tool is not in use and is being carried.

The opposing faces of the jaws of the tool, at their forward end, are provided with a number of parallel grooves 25 which enable the tool to be used as a wire splicer and a sharpened punch stud 26 is carried by the shank 5 rearwardly of the die blocks and engages in an opening 27 formed in the other shank of the tool when the handles are pressed together, this punch stud serving as a means whereby leather or thin sheet metal may be punched. I have also embodied in the tool rivet sets 27 and rivet headers 28.

What is claimed, is—

1. A tool of the class described comprising a pair of pivoted handle members formed at one side of their pivot with opposed coöperating faces, each of the members at the other side of the pivot being formed with a tool, and a removable protecting hand grip engaged upon the said tool end of each member.

2. A tool of the class described comprising a pair of pivoted handle members formed at one side of their pivot with opposed coöperating faces, each of the members at the other side of the pivot being formed with a tool, a removable protecting hand grip engaged upon the said tool end of each member, and means carried by one grip and engageable by the other for holding the members closed.

3. A tool of the class described comprising a pair of pivoted handle members formed at one side of their pivot with opposed coöperating faces, each of the members at the other side of the pivot being formed with a tool, a removable protecting hand grip engaged upon the said tool end of each member, the opposing sides of the two grips being flattened to fit one against the other, and means carried by one of the grips and engageable by the other for holding the pivoted members closed.

In testimony whereof, I affix my signature, in presence of two witnesses.

WILLIAM H. GRASSER.

Witnesses:
   J. H. STRADE,
   R. M. WALKER.